Figure 1:
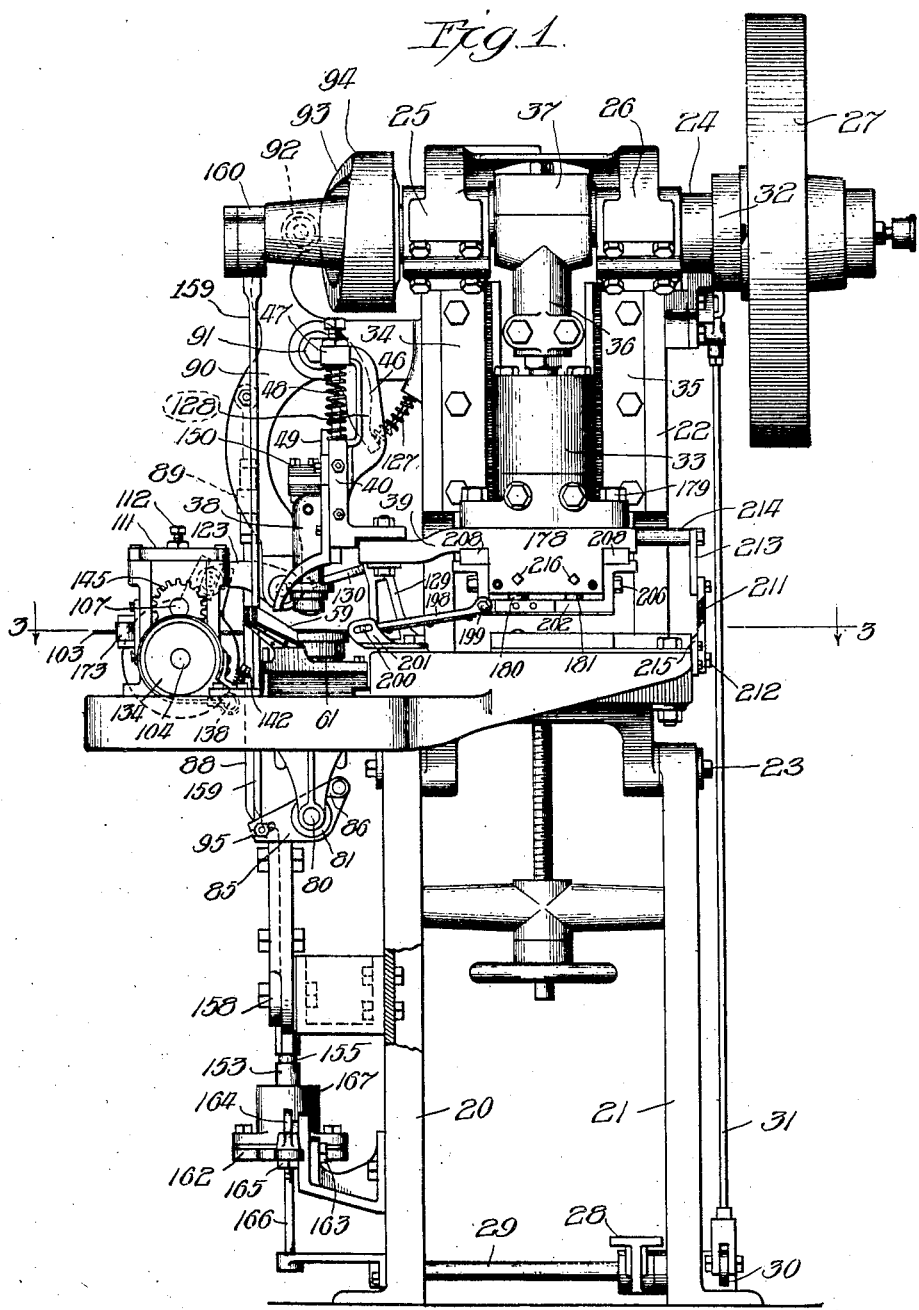

T. M. VAUGHAN.
MACHINE FOR MANUFACTURING ROOFING NAILS AND NAILING STRIPS.
APPLICATION FILED APR. 16, 1913.

1,119,553.

Patented Dec. 1, 1914.
8 SHEETS—SHEET 1.

T. M. VAUGHAN.
MACHINE FOR MANUFACTURING ROOFING NAILS AND NAILING STRIPS.
APPLICATION FILED APR. 16, 1913.

1,119,553.

Patented Dec. 1, 1914.
8 SHEETS—SHEET 4.

T. M. VAUGHAN.
MACHINE FOR MANUFACTURING ROOFING NAILS AND NAILING STRIPS.
APPLICATION FILED APR. 16, 1913.

1,119,553.

Patented Dec. 1, 1914.

8 SHEETS—SHEET 5.

Witnesses:
Harry S. Gaither
Rose Levitsky

Inventor
Thomas M. Vaughan
by Bauming & Bauming
Attys

T. M. VAUGHAN.
MACHINE FOR MANUFACTURING ROOFING NAILS AND NAILING STRIPS.
APPLICATION FILED APR. 16, 1913.
1,119,553.
Patented Dec. 1, 1914.
8 SHEETS—SHEET 6.
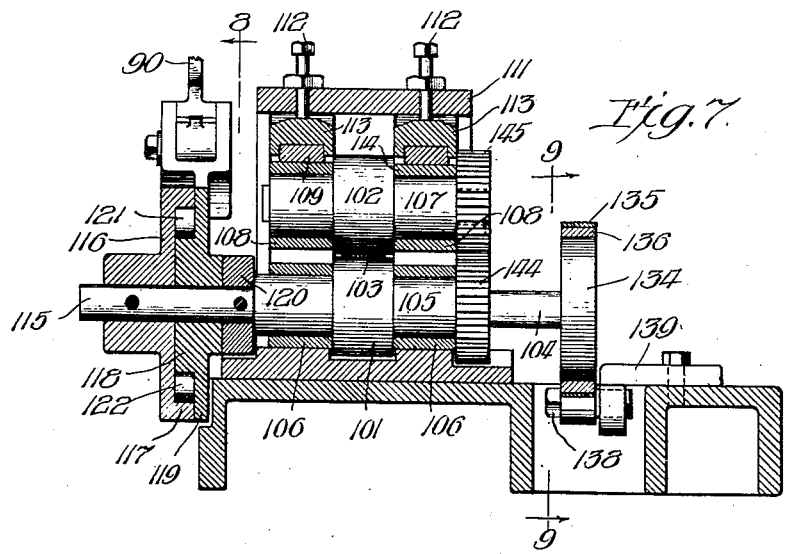
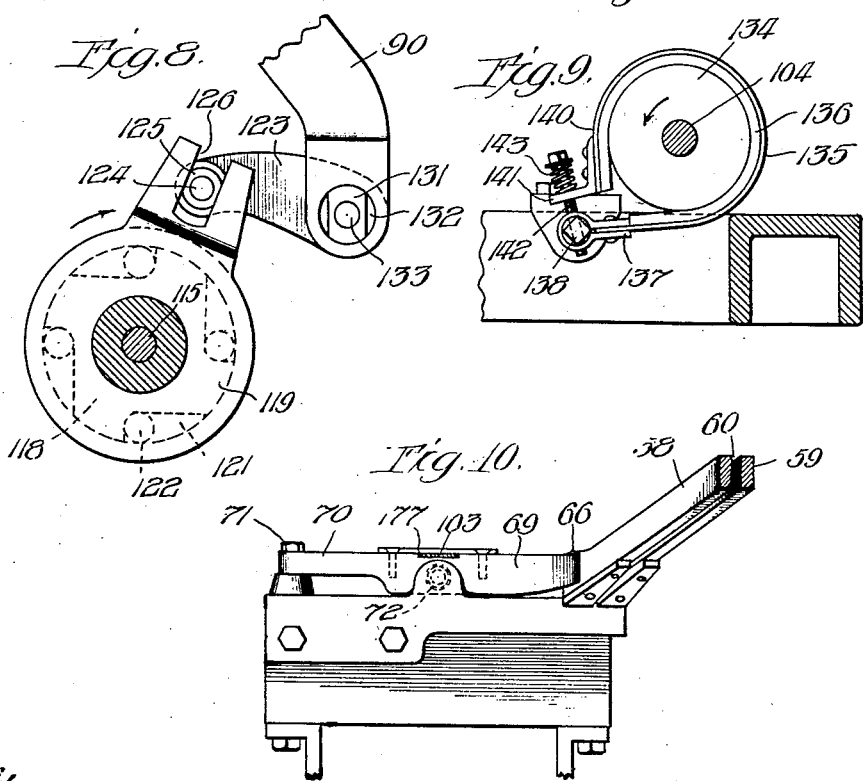

T. M. VAUGHAN.
MACHINE FOR MANUFACTURING ROOFING NAILS AND NAILING STRIPS.
APPLICATION FILED APR. 16, 1913.
1,119,553.
Patented Dec. 1, 1914.
8 SHEETS—SHEET 7.
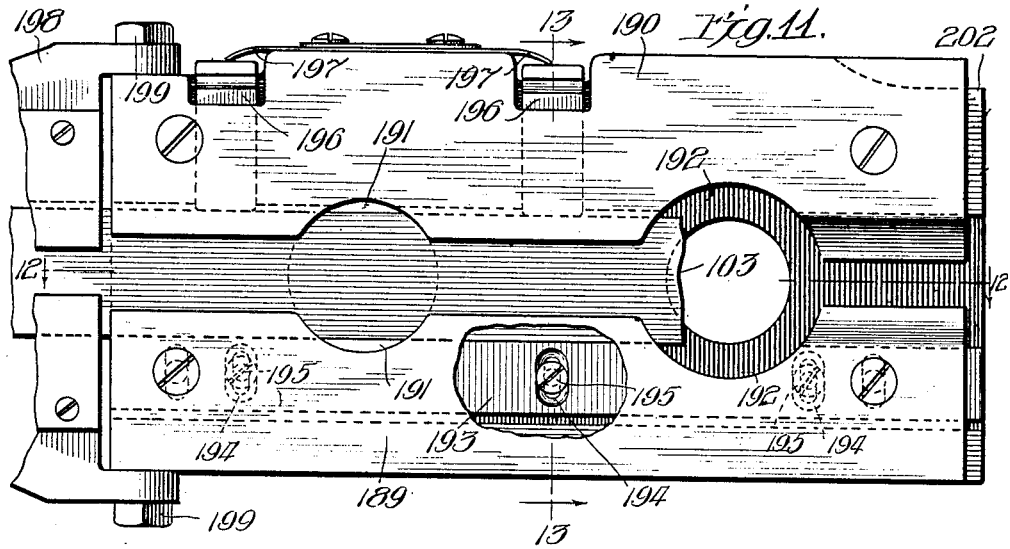
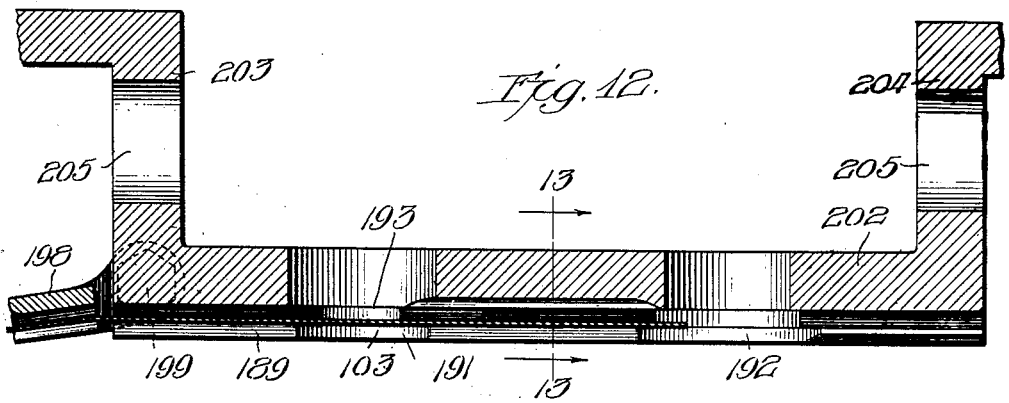
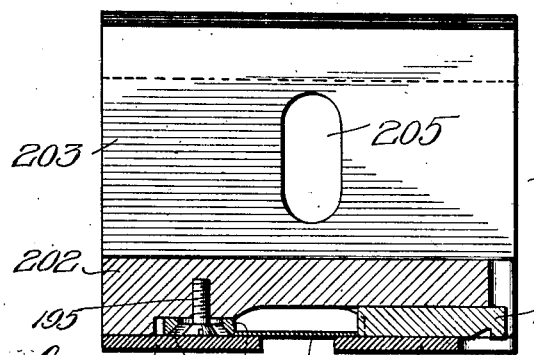

T. M. VAUGHAN.
MACHINE FOR MANUFACTURING ROOFING NAILS AND NAILING STRIPS.
APPLICATION FILED APR. 16, 1913.
1,119,553.
Patented Dec. 1, 1914.
8 SHEETS—SHEET 8.
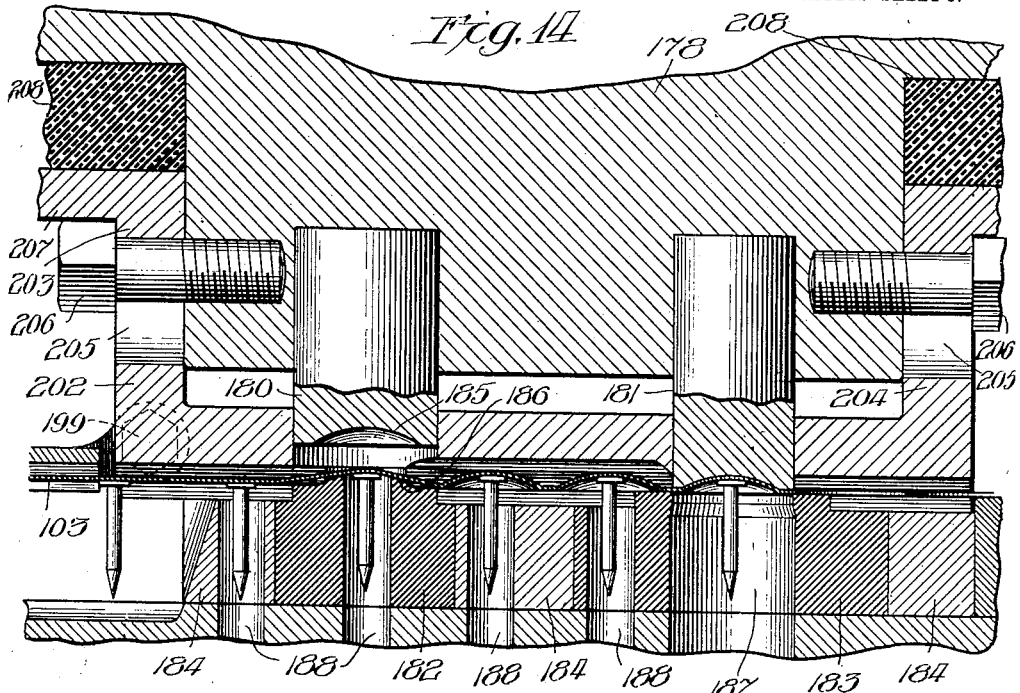
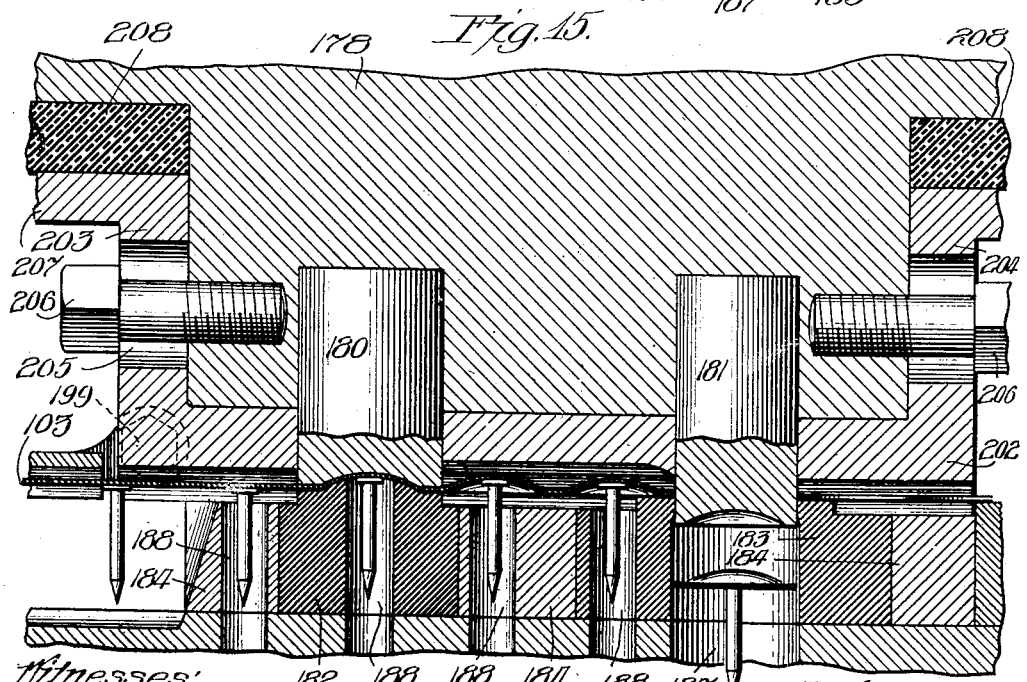

UNITED STATES PATENT OFFICE.

THOMAS M. VAUGHAN, OF BATTLE CREEK, MICHIGAN, ASSIGNOR TO ELECTRIC NAIL COMPANY, OF BATTLE CREEK, MICHIGAN, A CORPORATION OF MICHIGAN.

MACHINE FOR MANUFACTURING ROOFING-NAILS AND NAILING-STRIPS.

1,119,553. Specification of Letters Patent. Patented Dec. 1, 1914.

Application filed April 16, 1913. Serial No. 761,595.

*To all whom it may concern:*

Be it known that I, THOMAS M. VAUGHAN, a citizen of the United States, residing at Battle Creek, in the county of Calhoun and State of Michigan, have invented a certain new and useful Machine for Manufacturing Roofing-Nails and Nailing-Strips, of which the following is a specification.

The present invention relates to a machine for manufacturing large head nails which are ordinarily known as roofing nails. However, it will appear from a study of the mechanisms to be hereinafter disclosed that they can also be used for the manufacture of nailing strips when a certain portion of the machine is discarded or thrown out of commission. The roofing nails are generally made from tabs or disks of sheet metal, to which are secured the shanks which are driven into the wood. The nailing strip comprises a long strap of metal, such as hoop metal, to which are secured a number of prongs or shanks, generally spaced equidistant throughout its length. Roofing nails and nailing strips have heretofore been made in different ways, the different modes of manufacture generally relating to the manners of attachment of the shanks either to the nail head or to the strap, and, so far as I am aware, it has always been customary heretofore to attach the shanks by a riveting or swaging operation, except that in some cases the shanks of a nailing strip have been formed by striking ears or prongs out from the body of the strap from which the strip is made.

The present invention has reference to a machine for manufacturing either roofing nails or nailing strips in which the shanks are welded to the nail or to the strap, so as to provide a practically integral and indestructible connection between the parts. One of the main objections which has been raised to those forms of roofing nails and nailing strip in which the connections are riveted, has been that it is almost impossible to provide a riveted connection of such solidity and closeness as to absolutely preclude the entrance of moisture between the shank and the head or between the shank and the strap. It is a well known fact that moisture will readily find its way into very minute cracks or openings, and when it does so rusting will commence at these points and rapidly spread to the body of the metal. This fact is recognized in certain forms of riveted roofing nails and nailing strips, in which convex projections are formed around the riveted connections, so that the nails or strip will shed water with the greatest possible facility.

As before stated, the machine of the present invention is intended for the manufacture either of the welded nail or nailing strip. When used for the manufacture of the nailing strip, certain elements of the machine may be discarded or thrown out of commission, but the remaining mechanisms by which the shanks are welded to the strip will remain unchanged, so that the machine can be used to produce the nailing strip.

The machine of the present invention makes use of an electric current to produce the heat for the welding processes. This current is directed between the shanks and the strap for the desired length of time and is of the necessary intensity for generating the welding heat after a proper interval of contact. The intensity of the current is determined largely by the amount of time available for welding each shank to the strap, and, therefore, is determined largely by the speed at which the machine is to be operated. Therefore, my invention contemplates as one of its features the production of a machine having mechanisms whereby the intensity of the current may be proportioned to the speed of operation, so as to deliver a heavier current when operating rapidly than is used when operating slowly. As a general rule, in order to produce a satisfactory welded connection, an extra pressure or impact must be applied between the parts after the proper temperature has been attained. This serves to bring the parts into intimate relationship and to insure a perfect weld or union of the metals. Therefore, the present invention also contemplates the provision of means for creating a momentary pressure or impact of desired intensity after the welding heat has been attained.

The main object of the present invention is to so construct a machine for the present purposes as to make possible the attainment of all of the results hereinbefore specified, as well as other results which will appear from a study of the specification.

Other objects and uses of the invention will appear from the detail description of the mechanisms, which consist in the features of construction and combination of parts hereinafter described and claimed.

Figure 2:
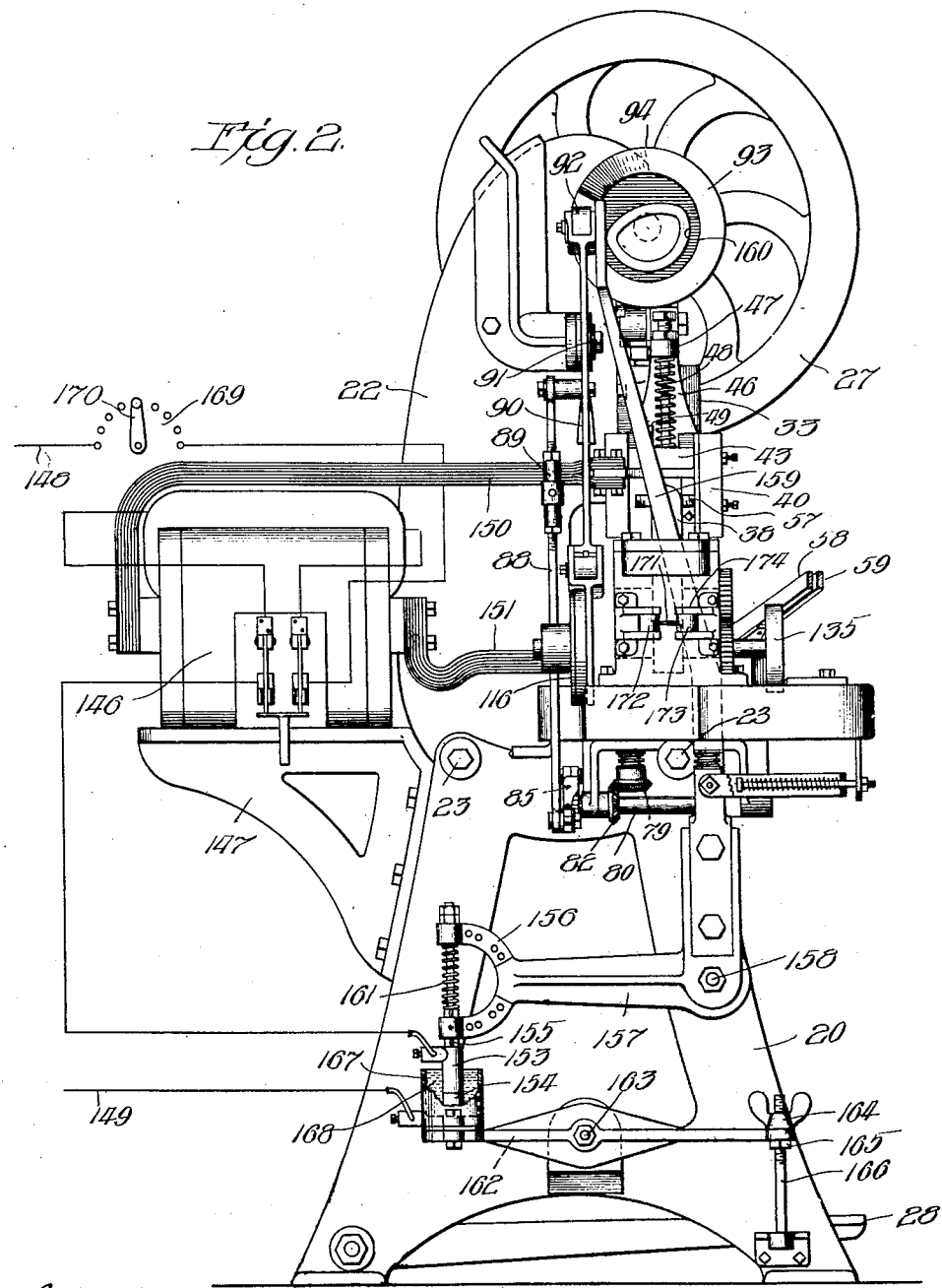
Figure 3:
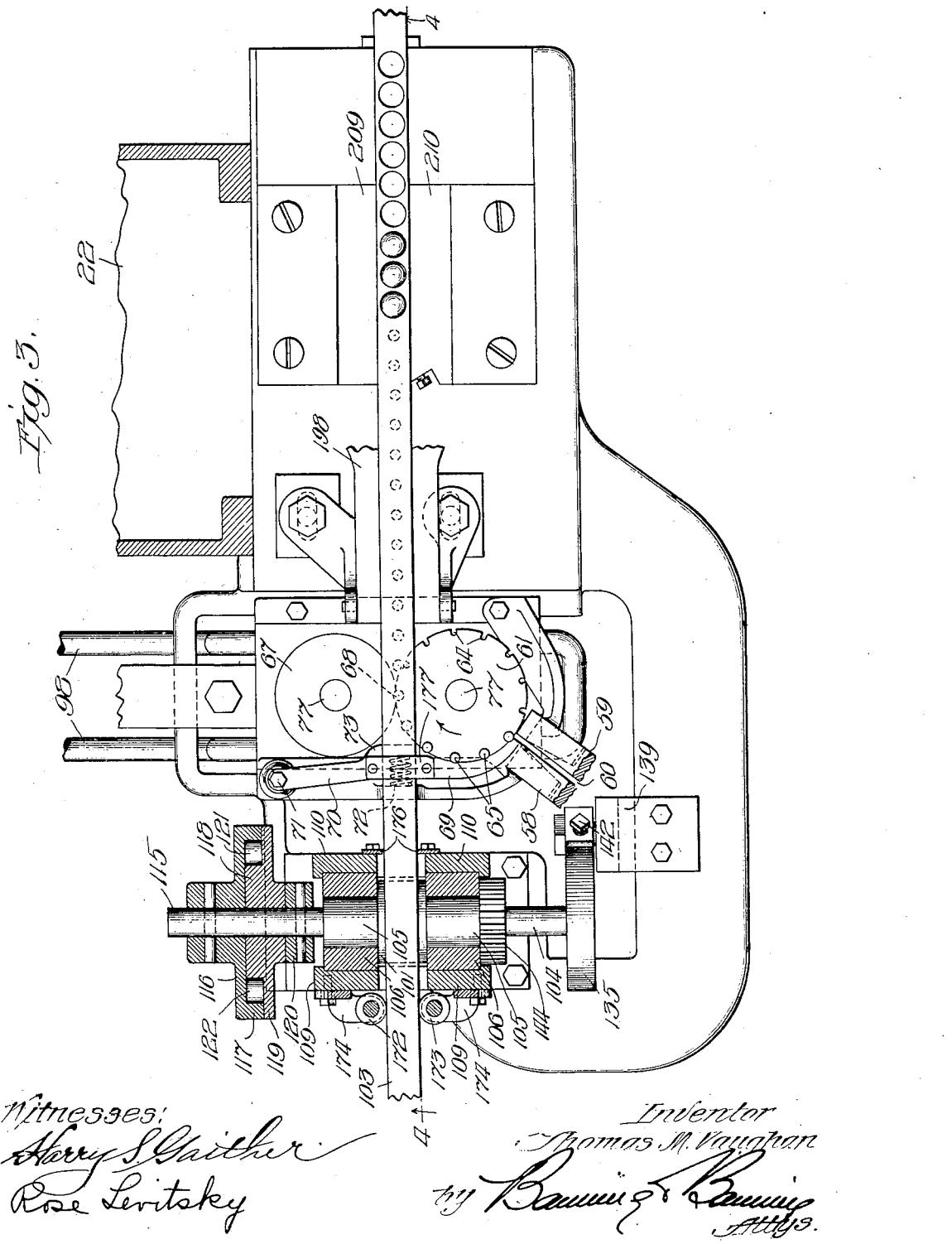
Figure 4:
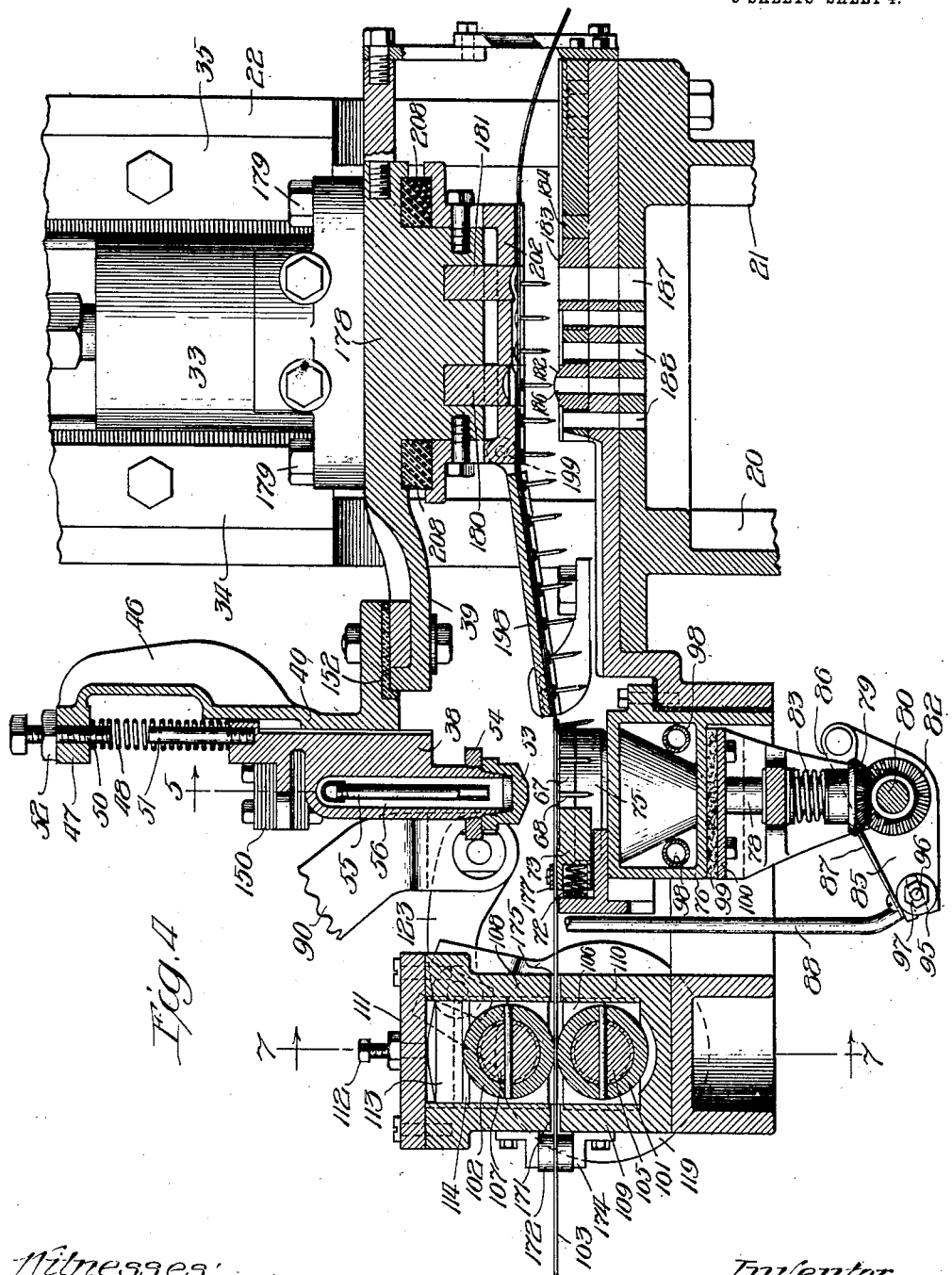
Figure 5:
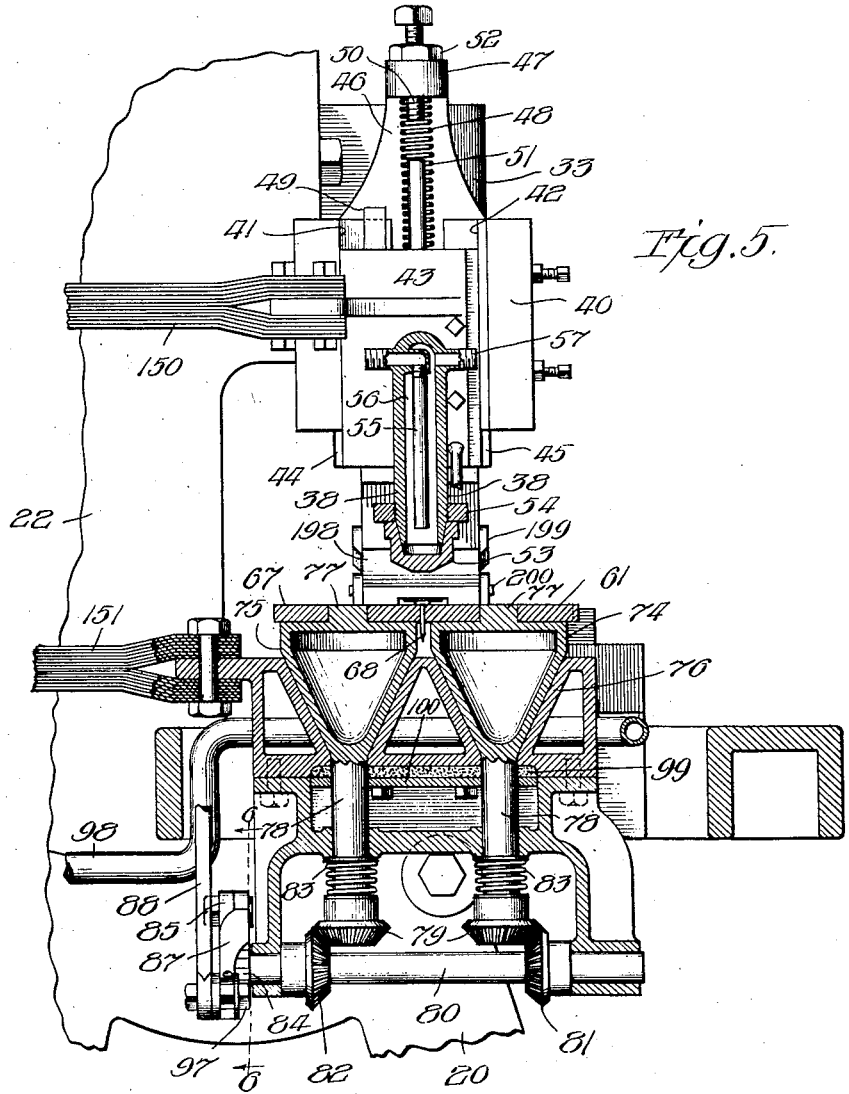
Figure 6:
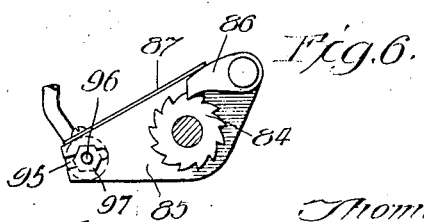

In the drawings: Figure 1 shows a side elevation of the completed machine with the press head and welding head in raised position such as they occupy during the advancement or feeding of the strap; Fig. 2 shows a front view corresponding to that of Fig. 1, with the exception that the press head has been lowered to bring the electric contacts into engagement for the purpose of delivering the welding current to the welding head; Fig. 3 is a plan view of the base plate and shank delivering mechanisms, and is a section taken substantially on line 3—3 of Fig. 1, looking in the direction of the arrows; Fig. 4 is a cross section through the machine from front to rear, and is taken substantially on line 4—4 of Fig. 3, looking in the direction of the arrows; Fig. 5 is a detail section through the welding mechanism, showing particularly the manner in which the shank feeding disks and cones are cooled, and is taken on line 5—5 of Fig. 4, looking in the direction of the arrows; Fig. 6 is a detail of the ratchet mechanism, whereby the shank feeding devices are advanced, and is a section taken on line 6—6 of Fig. 5, looking in the direction of the arrows; Fig. 7 is a section through the strap feeding rolls, and is taken on line 7—7 of Fig. 4, looking in the direction of the arrows; Fig. 8 is a detail of the clutch, whereby the shank feeding rolls are advanced, and is taken on line 8—8 of Fig. 7, looking in the direction of the arrows; Fig. 9 is a detail of the brake mechanism, whereby the strap feeding rolls are prevented from overthrowing or moving too far after the strap has been advanced the desired distance, and is a section taken on line 9—9 of Fig. 7; Fig. 10 is a detail elevation of the guides, whereby the shanks are delivered to the shank-feeding mechanism; Fig. 11 is a bottom plan view of the press head, showing particularly the strap guides and the means whereby said guides may be adjusted according to the width of the strap, so that the strap will always be properly centered; Fig. 12 is a vertical section taken on line 12—12 of Fig. 11, looking in the direction of the arrows; Fig. 13 is a vertical section taken on line 13—13 of Fig. 11, looking in the direction of the arrows; Fig. 14 is a vertical section through the press head and the male and female dies, showing the press head in the position which it occupies just prior to the punching operation; and Fig. 15 is a section similar to that of Fig. 14, with the exception that the punching operation has been completed and the forming die has completed its stroke, so that upon the upstroke of the press head the male punching die will be stripped from the previously punched strap.

In general, the machine of the present invention includes as one of its elements a reciprocating welding head or other means which is adapted to weld the shanks to the strap, which strap may be advanced the desired distance each time for properly spacing the welded shanks thereon. When the machine is to be used for the production of nails as a completed product, the invention also contemplates as one of its elements a reciprocating punch head or other means carrying a punch die, and if desired a forming die, for giving a peculiar or desired contour to the nail heads. In conjunction with the above, mechanisms are provided for feeding one or more shanks into position, for advancing the strap, and, if desired, for accomplishing other particular and desirable results.

In the embodiment illustrated in the drawings, the machine is shown as mounted in a vertical position, but it will be understood that any other suitable arrangement may be adopted. The mechanisms are supported by a frame comprising a pair of vertical base plates or the like 20 and 21. To the upper portions of these plates there is secured a heavy frame 22, the connection being made by means of bolts 23, or in any other suitable manner. Across the upper portion of the frame 22, there extends a power shaft or the like 24, which shaft is journaled in the frame at the points 25 and 26, and may be driven in any manner desired, as, for example, by means of a belt passing over the pulley 27. In some locations, the pulley 27 would be driven continuously by a constantly moving belt, in which case it might be desirable to be able to control the movements of the mechanisms of the present invention. For this purpose I have provided a pedal 28 carried by a tumbler shaft 29, which shaft extends across between the lower ends of the plates 20 and 21 and carries a crank arm 30. The latter in turn connects by means of a link 31 to a clutch mechanism 32 in the upper portion of the machine, which clutch mechanism, when actuated, serves to connect the rotating pulley to the shaft. This clutch mechanism may be of any suitable form, and I will not describe in detail the particular arrangement illustrated.

The shaft 24 is provided with a crank or eccentric, by means of which the reciprocating movements of the welding and punching heads are secured. In the arrangement illustrated, a press head 33 is provided, the same having a pair of tongues adapted to work in slots or grooves of the frame and being held in place by means of plates 34 and 35, so that the head is accurately guided in its reciprocations. A short connecting rod or eccentric 36 joins the press head 33 to the crank on the shaft, a bearing 37 being provided for this purpose. The arrangements thus far described are well known in the art, and I will not here enter into a more detailed description of the same.

The welding head 38 is reciprocated by means of the press head, and for this purpose an extension 39 is carried out from the press head. This extension carries a bracket or guide 40, which has a pair of guide slots or grooves 41 and 42, best illustrated in Fig. 5, and between which a slidable plate 43, having tongues 44 and 45, is mounted. The head 38 is fixed to the plane 43.

From the above, it will be seen that the welding head may have a certain amount of free motion with respect to the press head, the object of which will presently be apparent.

An extension 46 is carried up from the bracket 40, said extension having a finger or lug 47, which serves as an abutment for a spring 48. This spring exerts a pressure between the lug 47 and the plate 43, tending to force the plate down at all times, and thus to carry the welding head against the upper surface of the strap. A finger 49, or the like, is mounted on and secured to the upper face of the plate 43, said finger serving to limit the amount of downward movement of the plate 43 with respect to the bracket, so that when the press head rises, the welding head will be carried with the plate 43. The parts are so proportioned that when the press head commences its downward travel, the welding head will come into contact with the upper surface of the strap before the downward movement is completed, after which the amount of pressure exerted on the welding head will increase by the compression of the spring 48. When the press head commences its upper movement, the bracket 40 will commence to travel up, and will move freely until the lug 49 picks up the plate 43, whereupon the welding head will be raised away from the strap. By properly proportioning the parts, the welding head can be maintained in engagement with the strap during the desired interval of time, and by reason of the flexible connection effected through the medium of a spring 48, the interval of contact may be made a very large percentage of the total of movements.

It was previously stated that in order to secure a perfectly satisfactory welded connection, a blow or excess pressure should be exerted between the parts which are being welded together, so as to bring the metals into intimate contact. I have, therefore, provided mechanism for delivering a blow or excess pressure to the welding head after the same has remained in contact with the strap for a certain interval of time. In the arrangement illustrated, this means comprises an adjustable finger 50, or the like, carried by the lug 47, and adapted to strike a projection 51 carried by the plate 43 just before the lower limit of movement of the press head is reached. This finger 50 may be in the form of a screw, as illustrated, carrying a lock nut 52, so that its position may be accurately adjusted according to the thickness of the strap which is being used, and according to the severity of the force which is to be delivered. Obviously, when using a relatively thick strap, the screw should be raised as compared with its position when using a thin strap. In order to more perfectly guide the spring 48 in its movements and to remove any possibility of its buckling, I have placed the finger 50 and the projection 51 within the spring, so that they serve the two functions of delivering the aforementioned blow and of guiding the spring.

On account of the fact that the welding head is subjected to the extremely high temperatures which are necessary to effect welding connections, I have provided means for continuously cooling the welding head. For this purpose, the welding head is made as best shown in Fig. 5, and it carries at its lower end a welding die 53, or the like, having a beveled or tapered inner surface which is adapted to engage a tapered surface on the lower end of the head. A nut 54, or the like, serves to force off the die when desired. An inlet pipe 55 serves to convey water or other cooling medium to the lower end of the welding head, and for this purpose the opening of said pipe is down in close proximity to the die, so as to insure a delivery of the cold water directly against the same. After the water has effected its cooling function, it passes upward through the space 56 and finds an exit at the point 57. Tubes or hose may be connected to the welding head, so as to permit a continuous supply of water to and from the same.

The machine which is herein illustrated and described is adapted to weld previously formed nails or the like to the lower surface of a strap for the purpose of providing the shanks of the roofing nails or box strap. It will be understood, however, that any other suitable elements might be used for providing the shanks. Inasmuch as the shanks are formed before being supplied to the present machine, means must be provided for feeding them into welding position one at a time, so that they can be individually welded to the strap. For this purpose, I have provided a shank feeding mechanism. I contemplate the use of any form of mechanism for delivering the shanks one at a time to a pair of guideways which lead down to another mechanism by means of which they are carried into welding position. These are the guide-ways 58 and 59, best shown in Fig. 10, and they are spaced apart a suitable distance to provide a slot 60. As the shanks descend this guideway, they remain suspended in the slot, being supported by their heads which rest on the upper faces of the guides. Adjacent to the lower ends of these guides, there is provided a rotatable feeding disk 61, best shown in Fig. 3, which has a plurality of notches or openings 64 in its periphery, each notch being of the proper size to admit the body of the shank but of such size that the same will be supported by its head. In Fig. 3, I have shown a number of shanks 65 in the positions which they occupy as they are carried around by the disk.

The shanks will generally be in the form of nails which are a commercial product, and sometimes this product is imperfect, so that the nails have burs or the like on the lower surfaces of their heads. These burs might obstruct or interfere with the free delivery of the nails to the notches of the disk 61, but in the present case I have so arranged the parts as to meet and overcome this difficulty. For this purpose, the lower ends of the guides 58 and 59 are mounted with their upper surfaces 66 a slight distance above the upper surface of the disk 61, so that the nails will drop off of the surfaces 66 and down onto the surface of the disk 61, without any possibility of interference from such burs.

Adjacent to the disk 61, I have provided another disk 67, which is in peripheral contact with the disk 61 and rotates therewith. As these disks are advanced, the shanks are carried around one at a time until they occupy the position of the shank 68 of Fig. 3, where the same is supported by the upper surfaces of both of the disks. In such position the shank will be rigidly held in place and can be best acted upon for the welding operation.

In order to hold the several shanks in position on the disk 61, as the latter is advanced, I have provided a peripheral guide for said disk. The same comprises a finger 69 carried by an arm 70, which is pivoted to a stationary part at the point 71, and is held in peripheral engagement with the disk 61 by means of a spring 72. The finger 69 extends inward in a considerable distance between the disks 61 and 67, so as to provide the lug 73, which insures a guiding of the shanks practically up to the time when they are supported by both of the disks.

The disks 61 and 67 are mounted or supported upon the upper surfaces of a pair of cones 74 and 75, respectively. These cones seat accurately in circular recesses of a frame or casing 76, so as to form good electrical contact therewith, but so as to permit a free rotation of the cones. On account of the intense heat which is generated during the welding process, the disks might become deteriorated and, therefore, said disks are made removable from the cones. However, in order to support them accurately in position on the cones, the latter are provided with lugs or projections 77, which extend up into recesses in the center portions of the disks.

Each cone is provided with a downwardly extending portion 78, the lower end of which carries a bevel gear 79. A short cross shaft 80 is suitably journaled in the frame and carries the bevel gears 81 and 82 meshing with the bevel gears 79, but said gears 81 and 82 are oppositely faced so as to cause the cones to rotate in opposite directions. This is necessitated in order that the contacting peripheries of the disks 61 and 67 shall travel in the same tangential direction at the point of contact. Springs 83 are provided on the portions 78 for drawing the cones down in firm engagement with the casing 76, so as to reduce the electrical resistance between the stationary and moving parts as much as possible.

In order to feed the shanks one at a time, the disks must be periodically advanced or rotated. This is accomplished by a periodical advancing of the shaft 80. Said shaft carries a ratchet 84; and a short crank arm 85 is mounted to oscillate on the shaft. Said crank arm carries the pawl 86 which meshes with the ratchet, and is held in engagement therewith by means of a spring 87. The oscillations of the arm 85 are timed with the reciprocations of the press head. This result is accomplished by means of a link or connecting rod 88, best shown in Figs. 1 and 2, the upper end of which link connects through the medium of a turn-buckle 89 to a bell crank 90. Said bell crank is pivoted to swing on the pivot 91, and its upper end carries a roller 92. This roller, in turn contacts against a cam face 93, of a block 94 secured to the end of the main shaft 24, so that the bell crank will be oscillated according to the rotations of the main shaft.

It is manifest that the disk 61 must be advanced at each operation a distance exactly corresponding to the distance between two of its notches. Otherwise the shanks will not be properly fed to the strap. Owing to difficulties and imperfections of manufacture, it might be found that the ratchet 84 and the gears 79, 81 and 82 were not proportioned to secure exactly the desired amount of feed. Therefore, I have provided means for accurately proportioning or adjusting the mechanisms after the parts are completed, so that by test the feed can be exactly adjusted. This adjustment comprises a slot or notch 95 in the end of the arm 85, within which slot a pin 96 is seated, which pin effects the connection between the arm 86 and the lower end of the link 88. A nut or the like 97, serves to clamp said pin in position. If it were found upon test that the disk 61 was feeding a little farther than was desired, the pin 96 could be set out a little farther in the slot 95, so as to effect a less amount of movement of the ratchet 84 than would otherwise be obtained, thereby compensating for the inequalities and securing the necessary adjustment.

On account of the intense heat generated by the welding process, it is desired to be able to cool the disks 61 and 67 and the cones 74 and 75. For this purpose the casing 76 is made hollow, so that it may be filled with oil or the like, and a cooling pipe 98 is passed through the casing so that the oil contained therein can be cooled by a continuous stream of water.

In order to enable the parts to operate as smoothly as possible, it might be desired to oil the cones, and in order to collect or take up any oil which might find its way through between the cones and the casing, I have provided an absorbent pad or the like 99 which pad is mounted adjacent to the lower ends of the cones. This pad is held in place by means of a removable block 100, best shown in Fig. 5, so that the pad may be renewed from time to time.

With the parts thus far described, the individual shanks may be fed in one at a time to the proper position for welding. However, means must be provided for feeding the strap along and advancing it the proper distance each time, so that the shanks will be welded at the proper points throughout its length. This advancing mechanism is best shown in Figs. 3, 4, 7, 8, 9, and 10, and comprises a pair of rollers 101 and 102, between which the strap 103 passes. The roller 101 is secured to a shaft 104, having enlargements 105, which are journaled in a pair of blocks 106, best shown in Figs. 3 and 7. In like manner, the roller 102 is secured to a shaft 107, which is journaled in the blocks 108. All of the blocks 106 and 108 are mounted within a stationary framework having vertical guide portions 109 and 110, so that said blocks are free to adjust themselves within certain limits, according to inequalities of the strap and according to the thickness thereof. However, the blocks are so supported that they cannot move endwise of the shafts. From an examination of Fig. 3, it will be seen that the feed rollers, being of greater diameter than the shafts, are held in place and hold the shafts against endwise movement, by reason of the engagement of such rollers with the blocks 106 and 108. A cross piece 111 connects the vertical portions 109 and 110, and serves as a support for the screws 112. These screws bear down on blocks 113, or at any rate exert a pressure upon them, so that the necessary pressure may be exerted between the two rollers 101 and 102. In order to provide a certain amount of flexibility between the rollers, I have placed compressible pads 114 between each of the blocks 113 and the corresponding block 108. These compressible pads will serve to allow the upper roller to adjust itself according to inequalities in the thickness of the strap, but will serve to insure an even pressure on the strap at all times.

The shaft 104 is provided with an extension 115, to which is secured a sleeve 116, which comprises one element of a feeding clutch. This sleeve has a peripheral flange 117, which surrounds a circular lug or projection 118 carried by a plate 119 which is free to rotate or oscillate on the extension 115. A collar 120 holds the plate having the lug 118 in position with respect to the sleeve. The projection 118 is provided with a number of peripheral notches 121, or the like, and rollers or balls 122 are placed in said notches and are held in place by the peripheral flange 117. Each of the notches 121 has an abrupt face and a gradually sloping face, so that when the plate is moved in the direction of the arrow of Fig. 8, the balls will be caused to lock between their respective notches and the peripheral flange, and will thus serve to feed the sleeve carrying said flange and thereby rotate the shaft 104 carrying the roller 101.

Means must be provided for intermittently rocking or oscillating the plate 119 carrying the projection 118. For this purpose, I make use of the bell crank 90 which has heretofore been described. The lower end of the depending arm of the bell crank carries a finger 123, which in turn is provided with a pin 124 carrying a block 125. This block can have a certain amount of sliding motion in a slot or notch 126 of the plate 119, so that as the bell crank oscillates back and forth it will rock said plate 119 with it for the purpose of effecting a feeding of the roller 101. It will be noted that the power stroke of the bell crank is that stroke during which its lower end is traveling to the right in Figs. 1 and 8, which is also the stroke during which the upper end is traveling to the left. In other words, the feeding stroke is delivered by forcing the roller to the left by means of the cam. Means must be provided for restoring the bell crank at the end of each feeding stroke, and I have, therefore, provided a spring 127, best shown in Fig. 1, which spring abuts against a lug on a stationary part and against a finger 128 carried by the bell crank. During rapid operation of the machine, difficulty might be experienced on account of the tendency for the bell crank to overthrow and thus feed the strap too far. I have, however, provided means for preventing such overthrow, said means being an abutment for limiting the movement of the lower end of the bell crank to the right. In the particular arrangement illustrated, I have provided a bracket 129 of Fig. 1, which carries an adjustable screw 130, or the like, which screw may be accurately set to prevent a movement of the lower end of the bell crank farther than that necessitated by reason of the cam.

It is desired to provide means for adjusting the amount of feed imparted to the strap during each cycle of movement, so as to properly space the shanks thereon. It will be noted that in the particular arrangement illustrated, the amount of throw of the bell crank cannot be modified or changed, so I have provided means for securing the desired adjustment without the necessity of changing the throw of the bell crank. This is best illustrated in Fig. 8, in which it will be seen that the finger 123 is connected to the lower end of the bell crank by means of a nut 131, or the like, which seats into a recess 132 on the lower end of the bell crank. Said nut threads onto a pin 133 carried by the finger 122, and when tightened up it secures said finger rigidly to the bell crank. By setting the finger down so that it will work in the lower portion of the slot 125, it will be seen that a greater throw will be imparted to the plate 119 carrying the projection 118 than will be obtained when the finger is set up higher, because the throw of the bell crank is uniform in all cases.

During rapid operation of the machine there might be a tendency for the feed rollers 101 and 102 to continue rotation for feeding purposes even after the movement of the bell crank had ceased. Therefore it is desired to provide means for preventing an overthrow of the feeding rollers after the feeding force imparted by the bell crank ceases. For this purpose, I have secured a disk or brake wheel 134 to the end of the shaft 104. A brake strap 135, having a suitable facing of contacting material 136, partly surrounds said disk, and said strap has its end 137 secured by means of a pin 138 to a stationary part. The stationary part in the arrangement illustrated is the lug 139 of Fig. 7. The other end 140 of the strap carries a lug or projection 141, through which extends a pin or bolt 142, and a spring 143 serves to press the finger 141 down so as to hold the strap in engagement with the disk. It will be seen that as long as the disk is rotating in the direction of the arrow of Fig. 9, which is the direction for feeding purposes, the spring 143 will hold the strap tightly against the disk 134, so that a sufficient friction will be generated between the parts to insure a sudden and positive arresting of the feeding movement as soon as the feeding force from the bell crank ceases.

In order to insure a better feed of the strap I have provided the gear 144 on the shaft 104 which gear meshes with the gear 145 on the shaft 107 carrying the roller 102.

With the mechanisms thus far described, the machine is capable of periodically feeding the strap predetermined and equal distances, and is capable of feeding in the shanks one at a time to their proper positions beneath the strap. Said machine is also provided with a welding head which makes contact with the upper face of the strap for the desired interval of time and then delivers a blow to the strap after the welding heat has been attained. It is obvious that any desired means might be used for supplying the electric current to the strap and to the shank for the purpose of generating the welding heat, and in the particular arrangement illustrated I have shown one method of accomplishing this result which is a satisfactory method, although, of course, I am in no wise limited to its use except as called for in the claims. In the arrangement illustrated I have mounted a transformer 146 of suitable capacity to one side of the machine, said transformer being preferably mounted on a bracket 147. This transformer is adapted to take current of comparatively high voltage and small volume from the leads 148 and 149, and to transform the same to a current of very low voltage but very great volume, and deliver the same to the leads 150 and 151. These leads are shown as extending from the ends of the transformer. The lead 150 connects to the plate 43 which carries the welding head, and the lead 151 connects to the casing 76 within which are mounted the cones 74 and 75. It is obvious that, when the die 53 of the welding head is brought down against the upper surface of the strap, the electric circuit may be closed and a very large current will flow which current may be maintained for the necessary length of time to cause the parts to attain the welding heat. It is a well known fact that the amount of energy which is delivered or converted at any portion of an electric circuit depends upon the resistance of that portion to current flow, and upon the volume of the current flowing. Therefore, in order to concentrate the energy of the welding current as much as possible the resistance between the shank and the strap should be large as compared to the resistance of any other portion of the circuit. In constructing the present machine I have so arranged the parts as to obtain this result in the best manner. The leads 150 and 151 are made of material having a large cross section, and the same is true of the plate 43 and of the casing 76. Likewise the surface of contact of the cones 74 and 75 with the casing 76 is large, and the disks 61 and 67 have large areas of contact with their respective cones.

Examination of Figs. 3 and 7 in particular will show that as each of the shanks is carried around into welding position, being the position of the shank 68 in Fig. 3, that said shank is supported by both of the disks 61 and 67. Furthermore its head rests directly upon the upper surface of both of said disks, and its depending portion is gripped between the notch of the disk 61 and the periphery of the disk 67. For all of the above reasons each shank will be held very securely as it comes into welding position and will have a large surface of contact with the disks 61 and 67, so that only a relatively small amount of energy will be dissipated at such point of contact. In addition to the above the cones are continuously cooled by the stream of water flowing through the pipe 98, and the die 53 of the welding head is continuously cooled by the stream flowing in by way of the pipe 55. Therefore, by far the greater portion of the electric energy will be converted into heat at the point of contact between the shank and the strap, in other words at the point where it will be of greatest service.

On account of the large size of the conductors 150 and 151 I prefer to make them from a number of laminations as best shown in Figs. 2 and 5, so as to provide the greatest possible amount of flexibility. It will be noted also from an examination of Fig. 2 that the lead 150 is a comparatively long lead, the same extending from the end of the transformer which is farthest from the moving parts. This lead is purposely connected to said end so as to secure as much flexibility as possible in the lead by reason of the necessity of providing for the reciprocation of the plate 43. It will be noted from an examination of Fig. 5 that the plate 43 which carries the welding head is slidably mounted in the block 40 so that an electric contact exists between these parts. Furthermore the lug 39 which extends out from the press head 33 is in electrical communication with the press head, while the press head in turn is in electrical communication with the casing 76. Therefore the block 40 carrying the slidable plate 43 must be insulated from the lug 39 by means of the insulation 152 as shown particularly in Fig. 4.

With the arrangement as thus far described, the electric circuit would be established as soon as the welding head comes down into contact with the upper surface of the strap, and said current would be maintained as long as said contact continued. Such an arrangement would be objectionable for a number of reasons, among which may be stated the uncertainty of the duration of the contact, and the fact that the contact would be of comparatively light pressure at the beginning and at the end of its existence. For these reasons I have provided means for automatically and positively opening and closing the electric circuit so as to maintain the contact each time during exactly the desired interval. This means comprises a switch under the control of a moving part and properly timed to make and break the contact according to the particular requirements. I prefer to place this switch in the primary circuit between the leads 148 and 149 because in such circuit it will handle a current of comparatively small volume. The switch comprises two contacts 153 and 154, the contact 154 being mounted stationary while the contact 153 is carried by a post 155. Said post is mounted for endwise movement within a bracket 156 carried by a bell crank arm 157 which bell crank is pivoted at the point 158. The other arm 159 of said bell crank has a lug on its upper end which lug works against a cam surface 160 on a block which is mounted on the main shaft. This cam surface is so formed as to swing the bell crank back and forth according to the rotations of the main shaft, thereby causing the contact 153 to periodically rise and fall for the purpose of making and breaking the circuit.

In order to allow the circuit to remain closed for the desired interval during each cycle of movements, I mount the pin 155 which carries the contact 153, slidably within the yoke 156, and I provide a spring 161 which forces down on the pin 155, by reason of which spring there is provided a yielding connection between the contact 153 and the yoke. A stop limits the amount of throw of the pin, but there is a sufficient amount of movement permitted to allow the contacts to come together shortly after a cycle of movements commences, and to allow them to remain together until said cycle of movements has practically ceased. In other words, with the arrangement thus far described, the current will be periodically applied and broken by means of this positively driven switch.

In carrying on certain classes of work, it is desirable to maintain the current during a greater portion of the cycle than when carrying on other classes of work. Furthermore when operating the machine at high speed the portion of the cycle during which current is applied should possibly be different from that when operating the machine at low speed. Therefore I have provided means for adjusting the switch so that the contact will be established and maintained during a greater or less portion of the total cycle of movement depending upon the position of the adjustment. For this purpose the lower contact 154 is carried by an arm 162 pivoted to a stationary part at the point 163, the position of which arm can be accurately adjusted by means of a wing nut 164, and clamp nut 165, carried by the pin 166. Obviously by lowering the contact 154 the circuit will be established later in the cycle of movements, and will be broken earlier, than will be the case when it is raised. In other words, the percentage of cycle during which the circuit will be maintained can be adjusted by raising and lowering this contact. On account of the frequent making and breaking of the electrical contacts, and on account of the rapidity of the operation it is desirable to protect the contacts as much as possible and to provide for the instantaneous extinguishment of the arc. For this purpose, a cup or the like 167 is mounted on the arm 162, said cup surrounding the contacts and being filled with liquid, such as oil or the like 168.

The temperature at the point of contact between each shank and the trap must be raised to a welding heat within a very short interval of time. The interval available for attaining this temperature is dependent very largely upon the rapidity of operation of the machine, and furthermore the intensity of the current necessary for attaining the welding heat during a given interval of time is largely dependent upon the size of the shanks which are being attached to the strap, as well as upon the cross section of the strap itself, because a large strap will conduct heat away from the welding point more rapidly than a small one. For both of the above reasons it is desired to provide means for adjusting or determining the intensity of current which will flow during the establishment of each contact. In the arrangement illustrated such means takes the form of the rheostat 169 which is placed in the primary circuit, and has the movable contact 170 by means of which the volume of current can be adjusted. Of course the volume of current in the secondary, namely, the welding current itself, will depend upon the volume of current which will flow in the primary as governed by this rheostat.

Means should be provided for guiding the strap in its movements between the feed coolers and in its movement over the disks 61 and 67. It is necessary to guide the strap in this manner for the purpose of insuring that the shanks will be centrally attached when the welding operations have been completed. For the purpose of guiding the strap centrally upon the feed rollers I have provided the slot or slit 171 in the front end of the bar 109, and have mounted rollers 172 and 173 to the sides of said slit. By reason of the presence of these rollers the strap will be directed centrally through the slit and between the feed rollers 101 and 102. In order to accommodate the machine to different sizes and widths of strap each of the guide rollers 172 and 173 is carried by the bracket 174 which is adjustably mounted on the bar 109 so that it can be accurately positioned according to the width of the strap.

As the strap emerges from between the feed rollers it passes through a slit 175 in the bar, and a pair of guide plates 176 close the sides of said slit to assist in guiding the strap. Finally as the strap commences to pass over the disks 61 and 67 it passes beneath a guide plate 177 best shown in Figs. 3 and 4, and by means of which it is so directed as to insure a proper placing of the shanks.

The machine, as thus far described, is capable of producing box strap or the like, in which the shanks are uniformly spaced along the strap and in which the shanks are welded to the strap. In other words the machine, as thus far described, is a full and complete operative machine, for the production of such a product, and inasmuch as this product is a useful product, it follows that the machine, as thus far described, is a useful machine within the meaning of the patent law. I have, however, combined with this machine suitable dies and the like for taking the strap with the depending shanks, and stamping or forming nail heads in the strap, and then punching or separating each head from the strap. In the arrangement illustrated, these means comprise suitable dies and the like which are mounted on or driven by the press head 33 so as to be actuated periodically with the movements of the welding head 38.

It was previously shown that the lug 39 which carries a welding head extends out to one side of the press head. As a matter of fact this lug or extension is preferably formed as an extension of a die block or press block 178 which is secured directly to the lower face of the press head as by means of the tap screws 179, and which die block carries a male forming-die 180 and a male punching-die 181. Beneath the die block and the male dies there is located or mounted a female die block 182. The same seats or sets within a surrounding frame or the like 183 by means of which it is accurately centered. The lower face of the male forming-die 180 is formed with a concave depression or the like 184 which is adapted to co-act with a similarly formed projection 185 on the female die plate, so that these two co-act together to form up the strap into the nail heads. In like manner the male punching die 181 is adapted to co-act with a hole or perforation 186 of the female die for the purpose of punching out the previously formed heads from the strap, and to deliver the completed nails. In order to provide a perfectly clean and square cut the perforation 186 has its lower portion slightly enlarged as compared to its upper cutting edge, so that as the male die enters the perforation and releases the nail heads they will drop freely as illustrated in Fig. 15

The strap of course is fed in lengthwise between the female die plate and the press-head so that each shank is delivered to a point centrally between the forming dies where the head is formed, and then the strap is advanced to the point where the head is punched out. On account of the presence of the depending shanks, it is necessary to provide a series of perforations to accommodate the same while the strap itself is supported upon the upper surfaces of the female dies. These are the perforations 188 and they are spaced according to the spacings of the shanks. Each time a cycle of movements is completed the strap is fed forward a distance equal to that between two consecutive shanks. In order that each feeding operation may take place, the shanks must be raised above the surface of the female die plate, and for this purpose I have provided a guide on the lower portion of the press head which guide carries the strap, raising and lowering it according to the movements of the press-head, and keeping the strap properly centered at all times. This guide comprises the two plates or bars 189 and 190 which have their adjacent edges spaced the desired distance apart, but which are provided with notches 191 to accommodate the male forming die, and 192 to accommodate the male punching die. The adjacent edges of these guide bars are set so close together that they will support the strap as shown in Fig. 11. In order to keep the strap properly centered I have provided an adjustable bar 193 which is seated immediately above one of the bars 189, and has the slots 194 which receive the screws 195 so that said bar can be set either closer to or farther from the center line of the press-head according to the width of the strap which is being fed. In order to keep the strap in place at all times, I have provided a pair of movable fingers or blocks 196 which work in openings at the other side of the guide, springs 197 pressing against said blocks so as to hold their inner ends firmly against the edge of the strap. These blocks co-act with the bar 193 to center the strap, and obviously by means of the adjustment of said bar 193 straps of different widths may be kept properly centered.

On account of the fact that the press-head and the guides just described are constantly rising and falling while the disks 61 and 67 and the guide 177 always remain in the same plane, it is necessary to provide a movable guide for directing the strap from the guide 177 to the guides carried by the press-head. This movable guide is the bar 198 which has its upper end pivoted to the guides just described at the points 199 and its lower end is provided with a pair of pins 200 best shown in Fig. 1, which pins work in slots of stationary blocks 201. This guide bar 198 has its face slotted and undercut so as to support the strap in its longitudinal travel, and also to accommodate the depending shanks as best illustrated in Fig. 4.

It will be seen from an examination of Figs. 14 and 15, that as the press-head 33 descends, the male punching die 181 must fully enter the female punching die 187 while the male forming die 180 must be driven firmly against the female forming die 182. It is preferred that the latter function should take place at approximately the end of the stroke of the press-head, and in order to insure that the punching operation will be fully and completely performed it is preferred that the punching operation commence slightly before the forming operation. For this reason, I have carried the male punching die down somewhat below the male forming die, as best shown in Fig. 14, so that by the time the forming operation takes place the punching operation will have been completed, as shown in Fig. 15. Now in order to strip the strap from the punching and forming dies, so that the strap can be advanced into its next position, there must be provided a certain amount of free motion between the strap and the male dies. Inasmuch as the strap is carried by the previously described guides which are attached to the lower end of the press-head, it follows that said guides must also be movable with respect to the male dies. For this reason I have mounted said guides on a U-shaped bar or plate 202, the vertical arms 203 and 204 of which are provided with the slots 205 which receive tap screws 206 which in turn enter the lower end of the press-head. The vertical arms 203 and 204 have horizontal extensions on their upper ends, said extensions providing surfaces of contact against yieldable paddings of rubber or the like 208, as shown particularly in Figs. 4, 14, and 15. The U-shaped bar normally stands with respect to the press-head in the position shown in Fig. 14, where the compressible pad is expanded and where the U-shaped plate is supported by the tap screws. As the press-head commences to fall the bars 189 and 190 which constitute a portion of the strap guide will come into contact with the upper surfaces 209 and 210 of the bed which surrounds the female dies, and the travel of the guides and strap will be blocked. Thus the strap will be firmly and accurately centered immediately over the female dies. As the press-head continues its travel the compressible pads 208 will yield, as shown in Fig. 15, to allow the male dies to perform their functions, and then as the press-head commences its upward travel said dies will be stripped from the strap before the latter is advanced.

When using the machine for the manufacture of roofing nails it is sometimes desirable to cut up the punched strap into short lengths so that it can be easily handled and disposed of. For this purpose I have provided means for cutting up said strap after it has been punched. Said means comprises a blade 211 having one end pivoted to the bed of the machine at the point 212 and the other attached by means of a link 213 to an extension 214 of the press-head so that said blade will be raised and lowered with the movements of the press-head, as shown in Fig. 1. Said blade co-acts with a stationary blade 215 mounted on the bed of the machine for the purpose of severing the strap.

The above described mechanisms are a complete operative device or machine for the manufacture of roofing nails or the like having large heads with shanks welded thereto. It was previously shown, however, that by discarding or leaving out of commission the forming and punching dies the machine is a complete operative structure for the manufacture of nailing strip. Of course, the machine could be built in the first instance without these dies, but in case the machine were to be built substantially as described, the dies could be left off, or set into place according to requirements. For this purpose, I have provided the set screws 216 best shown in Fig. 1, which is a side elevation. By loosening up these set-screws, both of the male dies may be withdrawn so that the nailing strip will simply travel through the machine without being formed or punched. At such times it would also be desirable to leave off the blade 211 so as to leave the strip as a continuous piece instead of cutting the same up into sections. Or in case it were desired to manufacture nails with perfectly flat heads the forming die could be left off or thrown out of commission. I desire to point out, therefore, the fact that my invention consists in the combination of mechanisms for welding the individual shanks to the continuous metal strap, as well as in the combination of all of said mechanisms with other mechanisms for punching the nailing heads out from the strap, and for forming up said heads if so desired.

Although I have herein shown and described only one form of mechanism or machine embodying all of the above features and capable of producing all of the above results, still I do not limit myself to the same except as called for in the claims, but I contemplate within the scope of my invention any other equivalent mechanisms for accomplishing like or similar results.

I claim:

1. In a machine of the class described, the combination of means for periodically feeding a continuous strap of metal with intervals of rest between successive feeding operations, means for butt-welding pre-prepared shanks against one surface of the strap, and means for punching the strap to sever shank carrying sections therefrom.

2. In a machine of the class described, the combination of means for feeding a continuous strap of metal with periods of rest between successive feeding operations, means for butt-welding the ends of the shanks against one surface of the strap, and means for subsequently cutting the strap to sever shank carrying sections therefrom.

3. In a machine of the class described, the combination of means for feeding a continuous strap of metal by successive advancing and halting operations, and means for welding the end of a pre-prepared shank to one face of the strap during each period of rest of the same.

4. In a machine of the class described, the combination of means for feeding a continuous strap of metal by successive advancing and halting operations, means for carrying individual shanks into desired position adjacent to the strap, and means for welding the end of each shank to the strap during a period of rest of the strap.

5. In a machine of the class described, the combination of means for feeding a continuous strap of metal by successive periods of movement and rest, means for carrying individual shanks into desired position adjacent to the strap, and means for individually butt-welding the shanks to the strap during periods of rest of the strap.

6. In a machine of the class described, the combination of means for feeding a continuous strap of metal by successive advancing and halting operations, means for carrying individual shanks into desired position adjacent to one surface of the strap during the advancing operations of the strap, and means for individually butt-welding the shanks to the strap during periods of rest of the strap.

7. In a machine of the class described, the combination of means for feeding a continuous strap of metal, means for carrying individual shanks into desired position with respect to the strap during the movement of the strap, and means for individually butt-welding the shanks to the strap.

8. In a machine of the class described, the combination of means for intermittently feeding a continuous strap of metal by successive advancing and halting operations, means for carrying individual shanks into desired position adjacent to one surface of the strap during the advancing operations thereof, means for individually butt-welding the shanks to the strap during the halting operations thereof, and means for cutting the strap to sever shank carrying portions therefrom during the halting operations of the strap.

9. In a machine of the class described, the combination of means for feeding a continuous strap of metal by successive advancing and halting operations, means for individually feeding shanks adjacent to one surface of the strap during the advancing operations thereof, means for individually butt-welding shanks to the strap during the halting operations thereof, means for forming a shank carrying portion of the strap during a halting operation thereof, and means for subsequently severing such formed portion from the strap during a subsequent halting operation for the purpose of releasing a formed shank carrying portion from the strap.

10. In a machine of the class described, the combination of means for feeding a continuous strap of metal, means for delivering individual shanks adjacent to one surface of the same at a predetermined distance along such surface, and means for individually butt-welding the shanks to the surface.

11. In a machine of the class described, the combination of means for feeding a continuous strap of metal by successive periods of movement and rest, means for regulating the extent of movement of the strap during each feeding operation, means for delivering individual shanks adjacent to one surface of the strap, and means for individually butt-welding the shanks to the strap during the periods of rest thereof.

12. In a machine of the class described, the combination of means for individually delivering shanks to a desired point, means for intermittently feeding a continuous strap of metal over said point, and means for individually butt-welding the strap to the shanks delivered to said point.

13. In a machine of the class described, the combination of means for delivering individual headed shanks to a desired point and supporting them individually by their heads, means for intermittently feeding a strap of metal over said point, and means for individually butt-welding the shank heads to the strap.

14. In a machine of the class described, the combination of a rotatable notched disk, means for delivering shanks to the notches thereof, means for intermittently feeding a strap of metal over a point on the periphery of the disk, and means for individually butt-welding the shanks to the strap at such point.

15. In a machine of the class described, the combination of a rotatable notched disk, means for individually delivering headed shanks to the notches thereof, whereby the shanks are individually supported in said notches by their heads, means for tangentially feeding a strap of metal over the periphery of the disk, and means for individually butt-welding the shanks to the strap of metal.

16. In a machine of the class described, the combination of a pair of coöperating disks lying in a horizontal plane, one of which is notched, means for individually feeding shanks to the notches of said disk, means for rotating the disks in opposite directions, whereby the shanks are carried to the coöperating point of the disks, means for intermittently feeding a continuous strap of metal over said point, and means for individually butt-welding the shanks to the strap at such point.

17. In a machine of the class described, the combination of a pair of coöperating disks lying in a horizontal plane, one of which is notched, means for individually delivering pre-prepared shanks to the notches of said disk, means for rotating the disks in opposite directions, whereby the shanks are carried to the coöperating point of the disks, means for intermittently feeding a continuous strap of metal over said point, means for adjusting the amount of feed of the strap at each feeding operation, and means for butt-welding the shanks to the strap at such point.

18. In a machine of the class described, the combination of a pair of coöperating disks lying in a horizontal plane, one of which is notched, means for individually feeding shanks to the notches of said disks, means for rotating the disks in opposite directions to carry the shanks to the coöperating point of the disks, means for intermittently feeding a continuous strap of metal over said point, means for adjusting the extent of feed of the strap at each operation, and means for individually welding the shanks to the strap at said point.

19. In a machine of the class described, the combination of a pair of coöperating disks lying in a horizontal plane, one of which is notched, means for individually feeding shanks to the notches of said disk, means for rotating said disks in opposite directions to carry shanks to the point of coöperation of the disks, a pair of horizontally mounted friction feed rollers, adapted to the feeding of a continuous strap of metal, means for rotating said rollers intermittently, means for adjusting the extent of each intermittent rotation of the rollers, and means for individually welding the shanks to the strap at the point of coöperation of the disks.

20. In a machine of the class described, the combination of means for intermittently feeding a continuous strap of metal with periods of advancement and rest, means for individually carrying shanks into position adjacent to one surface of the strap, operating electrodes on the opposite sides of the strap, means for carrying said electrodes into coöperative relationship during periods of rest of the strap, and means for applying current through the electrodes and through the strap and shank during periods of rest of the strap.

21. In a machine of the class described, the combination of a shank carrying electrode, means for feeding a strap of metal into position over a shank carried by said electrode, a movable electrode mounted above the strap, means for carrying said electrode into contact with the strap, and means for applying current through both electrodes and through the strap and shank.

22. In a machine of the class described, the combination of an intermittently movable shank carrying electrode, means for intermittently moving a continuous strap of metal adjacent to shanks carried by said electrodes, a movable electrode mounted above the strap, and means for carrying said electrode into contact with the strap during periods of rest of the strap.

23. In a machine of the class described, the combination of an intermittently movable shank carrying electrode, means for individually feeding shanks to the same, means for intermittently feeding a continuous strap of metal adjacent to shanks carried by said electrode, a movable electrode mounted above the strap, means for carrying said electrode into contact with the strap, and means for applying current through both of the electrodes and through the strap and shank during periods of rest of the shank carrying electrode and the strap.

24. In a machine of the class described, the combination of a shank carrying electrode, means for individually feeding shanks to the same, means for intermittently feeding a continuous strap of metal adjacent to shanks carried by said electrode, a movable electrode mounted above the strap, means for carrying said electrode into contact with the strap, means for compressing the electrode against the strap to carry the strap firmly into contact with a shank, and means for applying electric current through both electrodes and through the strap and shank while said contact is maintained.

25. In a machine of the class described, the combination of a shank carrying electrode, means for individually feeding shanks to the same, means for intermittently feeding a continuous strap of metal adjacent to shanks carried by said electrode, a movable electrode mounted above the strap, means for carrying said electrode into contact with the strap under spring pressure to carry the strap firmly into engagement with a shank, means for applying electric current through both electrodes and through the shank and strap when such contact is formed, and means for delivering excess pressure to the movable electrode after a desired interval of time to thereby solidly weld the shank and strap.

26. In a machine of the class described, the combination of means for feeding a continuous strap of metal, means for individually feeding shanks into position adjacent to one surface of the same, means for carrying the shanks firmly into contact with said surface, means for establishing an electric current through each shank and strap when said contact is formed, and means for creating excess pressure between the shank and the strap after a predetermined interval of contact.

27. In a machine of the class described, the combination of means for feeding a continuous strap of metal, means for individually feeding shanks into position adjacent one surface of the same, means for carrying each shank firmly into engagement with the strap, means for delivering an electric current to the strap and through the shank after such engagement is established, and means for creating an excess pressure between the strap and the shank after the current has been created for a predetermined interval of time.

28. In a machine of the class described the combination of means for feeding a continuous strap, means for carrying individual shanks into desired position with respect to the strap, and means for individually butt-welding the shanks to portions carried by the strap.

29. In a machine of the class described the combination of means for feeding a continuous strap carrying portions of metal adapted to constitute nail heads, means for carrying individual shanks into desired position with respect to the strap, and means for individually butt-welding the shanks to the portions adapted to constitute nail heads.

30. In a machine of the class described the combination of means for feeding a nail head carrying strap having portions adapted to constitute nail heads, means for individually feeding shanks into position adjacent to the said portions adapted to constitute nail heads, and means for individually butt-welding said shanks to the portions adapted to constitute nail heads.

31. In a machine of the class described the combination of means for feeding a strap having portions adapted to constitute nail heads, means for feeding shanks into position adjacent to said portions, and means for butt-welding the shanks to said portions.

32. In a machine of the class described the combination of means for feeding a strap which carries portions adapted to constitute nail heads, means for feeding shanks into position adjacent to the portions adapted to constitute the nail heads, and means for butt-welding the shanks to said portions.

33. In a machine of the class described the combination of means for feeding a nail-head-portion carrying strap, means for feeding shanks into position adjacent to the nail head portions carried by said strap, and means for welding the shanks to the nail head portions so carried.

34. In a machine of the class described the combination of means for feeding a strap transporting portions adapted to constitute nail heads, means for feeding shanks into position adjacent to said portions, means for butt-welding the shanks to said portions, and means for subsequently removing said portions from the strap.

35. In a machine of the class described the combination of means for feeding a strap carrying portions adapted to constitute nail heads, means for feeding shanks into position adjacent to said portions, means for butt-welding the shanks to said portions, and means for severing said portions from the shank to produce the completed nails.

36. In a machine of the class described the combination of means for feeding a strap carrying portions of metal which are adapted to constitute nail heads, means for feeding shanks into position adjacent to said portions, means for butt-welding the shanks to said portions, said means for forming said portions into nail heads, and means for releasing said portions after they have been formed by the forming means.

37. In a machine of the class described the combination of means for feeding a strap carrying portions which are adapted to constitute nail heads, means for feeding shanks into position adjacent to said portions, means for forcing the shanks and the portions into firm contact, means for applying electric current through such contact for the purpose of welding the shanks to the portions, and means for breaking the electric current after the weld is completed.

38. In a machine of the class described the combination of means for carrying shanks and portions adapted to constitute nail heads into position with respect to each other, means for establishing firm contact between the butt of each shank and the face of the corresponding nail head portion, means for delivering electric current through the contact so established, means for breaking the electric current after the parts are welded together, and means for forming the nail head portion into a nail head.

39. In a machine of the class described the combination of means for feeding a strap carrying portions adapted to constitute nail heads, means for feeding shanks into position adjacent to said portions, means for establishing firm contact between the shanks and said portions, means for directing a flow of electric current through the contact so established, and means for breaking said electric current after the parts are welded together.

40. In a machine of the class described the combination of means for feeding a strap carrying portions adapted to constitute nail heads, means for feeding shanks into position adjacent to said portions, means for establishing firm contact between the shanks and said portions, means for directing a flow of electric current through the contacts so established, and means for forming said portions into nail heads.

41. In a machine of the class described the combination of means for feeding a strap carrying portions which are adapted to constitute nail heads, means for feeding shanks into position adjacent to said portions, means for establishing firm contact between said portions and shanks, means for directing a flow of electric current through the contacts so established, means for forming the portions into nail heads, and means for releasing the portions from the strap to provide the complete nails.

42. In a machine of the class described the combination of means for feeding a strap carrying portions adapted to constitute nail heads, means for feeding shanks into position adjacent to said portions, means for establishing firm contact between the portions and the shanks, means for cooling said contact establishing means, and means for directing a flow of electric current through the shanks and the portions which are adapted to constitute nail heads.

43. In a machine of the class described the combination of means for feeding a strap carrying portions which are adapted to constitute nail heads, means for feeding shanks into position adjacent to said portions, electrodes for establishing firm contact between the shanks and said portions, and means for cooling the electrodes.

44. In a machine of the class described the combination of means for feeding a strap carrying portions which are adapted to constitute nail heads, means for feeding shanks into position adjacent to said portions, electrodes for directing a flow of electric current through the shanks and portions, means for cooling the electrodes, and means for releasing the portions which are adapted to constitute nail heads from the strap.

THOMAS M. VAUGHAN.

Witnesses:
JENNIE E. ALDERDYCE,
LENA MYERS.